United States Patent
Nanivadekar et al.

(10) Patent No.: US 9,279,325 B2
(45) Date of Patent: Mar. 8, 2016

(54) TURBOMACHINE WHEEL ASSEMBLY HAVING SLOTTED FLANGES

(71) Applicant: General Electric Company, Schenectady, NY (US)

(72) Inventors: Meelan Ravindra Nanivadekar, Maharashtra (IN); Anil Mishra, Rajasthan (IN); Chethan Shankara, Karnataka (IN)

(73) Assignee: General Electric Company, Schenectady, NY (US)

( * ) Notice: Subject to any disclaimer, the term of this patent is extended or adjusted under 35 U.S.C. 154(b) by 723 days.

(21) Appl. No.: 13/672,253

(22) Filed: Nov. 8, 2012

(65) Prior Publication Data
US 2014/0127033 A1 May 8, 2014

(51) Int. Cl.
| | |
|---|---|
| *F01D 5/06* | (2006.01) |
| *B23P 15/00* | (2006.01) |
| *F01D 5/02* | (2006.01) |
| *F16B 39/01* | (2006.01) |

(52) U.S. Cl.
CPC ............. *F01D 5/022* (2013.01); *F01D 5/066* (2013.01); *F16B 39/01* (2013.01); *B23P 15/006* (2013.01); *Y10T 29/49481* (2015.01)

(58) Field of Classification Search
CPC ....... F01D 5/022; F01D 5/066; B23P 15/006; F16B 5/0275; F16B 39/01
See application file for complete search history.

(56) References Cited

U.S. PATENT DOCUMENTS

| | | | |
|---|---|---|---|
| 3,597,110 A | * | 8/1971 | Corsmeier ............. F01D 5/066 416/198 A |
| 3,697,130 A | | 10/1972 | Barecki et al. |
| 3,764,059 A | | 10/1973 | Knowles |
| 3,779,579 A | | 12/1973 | Ostwald |
| 3,789,635 A | | 2/1974 | Van Brunt et al. |
| 3,821,973 A | | 7/1974 | Carmien |
| 3,830,085 A | | 8/1974 | Gerlach |
| 3,866,524 A | | 2/1975 | Forbes, Jr. |
| 3,874,824 A | | 4/1975 | Cronstedt et al. |

(Continued)

FOREIGN PATENT DOCUMENTS

| | | |
|---|---|---|
| DE | 10007368 A1 | 9/2001 |
| EP | 0187264 A1 | 7/1986 |

(Continued)

OTHER PUBLICATIONS

Kartik et al., "Stud Hardware With Self-Contained Stud Anti-Rotation Feature and Method of Installing Studs", United States Statutory Invention Registration, Reg. No. H32, Published Mar. 4, 1986, pp. 1-5.

*Primary Examiner* — Igor Kershteyn
(74) *Attorney, Agent, or Firm* — Ernest G. Cusick; Frank A. Landgraff

(57) ABSTRACT

A turbomachine wheel assembly having slotted flanges includes a turbomachine wheel having a first wheel arm and a second, opposing wheel arm. The first wheel arm includes a first flange having a first radially outer surface and the second wheel arm includes a second flange having a second radially outer surface. The second flange includes a fastener retaining member extending axially outwardly from the second radially outer surface and an opening extending axially through the flange at the fastener retaining member. The fastener retaining member includes at least one wall section extending radially inward from the second radial outer surface.

20 Claims, 4 Drawing Sheets

(56) References Cited

U.S. PATENT DOCUMENTS

| | | |
|---|---|---|
| 3,911,548 A | 10/1975 | Perry |
| 3,941,506 A | 3/1976 | Robb et al. |
| 3,975,804 A | 8/1976 | Schenk |
| 4,056,035 A | 11/1977 | Centera |
| 4,066,184 A | 1/1978 | Cuthbert et al. |
| 4,066,372 A | 1/1978 | Swanson et al. |
| 4,236,873 A | 12/1980 | Sherman et al. |
| 4,308,646 A | 1/1982 | Schenk |
| 4,319,776 A | 3/1982 | Moberg |
| 4,414,618 A | 11/1983 | Jacobson |
| 4,538,746 A | 9/1985 | Hines |
| 4,651,596 A | 3/1987 | Rachanski |
| 4,716,746 A | 1/1988 | Journee |
| 4,781,502 A | 11/1988 | Kushnick |
| 4,844,694 A * | 7/1989 | Naudet ................ F16B 35/041 415/199.5 |
| 4,887,949 A * | 12/1989 | Dimmick, III .......... F01D 5/066 403/22 |
| 4,989,312 A | 2/1991 | Maddalena |
| 5,052,891 A * | 10/1991 | Burkholder ............ F01D 5/066 416/198 A |
| 5,350,278 A * | 9/1994 | Burge ..................... F01D 5/066 416/198 A |
| 5,388,963 A | 2/1995 | Dimmick, III et al. |
| 5,529,509 A | 6/1996 | Hayes et al. |
| 5,536,144 A | 7/1996 | Bednarz et al. |
| 5,537,814 A | 7/1996 | Nastuk et al. |
| 5,796,202 A | 8/1998 | Herron et al. |
| 5,927,063 A | 7/1999 | Janda et al. |
| 6,026,521 A | 2/2000 | Atkins |
| 6,389,814 B2 | 5/2002 | Viteri et al. |
| 6,427,885 B1 | 8/2002 | Dexel |
| 6,499,957 B1 * | 12/2002 | Klingels ................ F01D 5/066 416/198 A |
| 6,499,969 B1 | 12/2002 | Tombers et al. |
| 6,598,398 B2 | 7/2003 | Viteri et al. |
| 6,641,326 B2 * | 11/2003 | Schilling ............... F16B 5/0275 403/337 |
| 6,672,630 B2 * | 1/2004 | Pinzauti .................... F01D 5/06 285/405 |
| 6,716,070 B2 | 4/2004 | Christensson |
| 6,855,005 B2 | 2/2005 | Acacio |
| 6,945,029 B2 | 9/2005 | Viteri |
| 7,021,063 B2 | 4/2006 | Viteri |
| 7,043,920 B2 | 5/2006 | Viteri et al. |
| 7,207,721 B2 | 4/2007 | Wu et al. |
| 7,275,926 B2 | 10/2007 | Gomes et al. |
| 7,316,628 B2 | 1/2008 | Serkh |
| 7,360,310 B2 | 4/2008 | Bagepalli et al. |
| 7,390,170 B2 * | 6/2008 | Charrier ................ F16L 23/036 415/216.1 |
| 7,530,254 B2 | 5/2009 | Bilstein et al. |
| 7,736,125 B2 | 6/2010 | Bagepalli et al. |
| 7,774,939 B1 | 8/2010 | Onion |
| 7,903,257 B2 | 3/2011 | de Boer et al. |
| 8,967,978 B2 * | 3/2015 | Denis ..................... F01D 5/025 416/244 A |
| 2003/0068918 A1 | 4/2003 | Christensson |
| 2004/0031116 A1 | 2/2004 | Coleman |
| 2004/0234177 A1 | 11/2004 | Wu et al. |
| 2005/0031731 A1 | 2/2005 | Gomes et al. |
| 2005/0076683 A1 | 4/2005 | Chen |
| 2005/0089385 A1 | 4/2005 | Lin |
| 2005/0191151 A1 | 9/2005 | Gethmann |
| 2006/0192385 A1 | 8/2006 | Hiernard et al. |
| 2007/0101485 A1 | 5/2007 | Denzin |
| 2008/0067084 A1 | 3/2008 | Patterson et al. |
| 2008/0282457 A1 | 11/2008 | Denzin |
| 2009/0057501 A1 | 3/2009 | Huang |
| 2010/0284767 A1 | 11/2010 | Shue |
| 2014/0050563 A1 * | 2/2014 | Mishra .................. F16B 5/0275 415/68 |

FOREIGN PATENT DOCUMENTS

| | | |
|---|---|---|
| EP | 0216354 A2 | 4/1987 |
| EP | 0216354 A3 | 4/1987 |
| EP | 0216354 B1 | 4/1987 |
| EP | 0322561 A2 | 7/1989 |
| EP | 0339663 A1 | 11/1989 |
| EP | 0187264 B1 | 2/1990 |
| EP | 0365394 A1 | 4/1990 |
| EP | 0376641 A1 | 7/1990 |
| EP | 0392391 A2 | 10/1990 |
| EP | 0463751 A1 | 6/1991 |
| EP | 0450495 A2 | 10/1991 |
| EP | 0455490 A2 | 11/1991 |
| EP | 0464316 A1 | 1/1992 |
| EP | 0491526 A1 | 6/1992 |
| EP | 0526060 A2 | 7/1992 |
| EP | 0498552 A1 | 8/1992 |
| EP | 0499341 A2 | 8/1992 |
| EP | 0499342 A2 | 8/1992 |
| EP | 0499343 A2 | 8/1992 |
| EP | 0550218 A1 | 12/1992 |
| EP | 0556514 A2 | 12/1992 |
| EP | 0704601 A1 | 12/1992 |
| EP | 0572202 A1 | 5/1993 |
| EP | 0547812 A1 | 6/1993 |
| EP | 0568944 A1 | 11/1993 |
| EP | 0614199 A1 | 2/1994 |
| EP | 0616111 A1 | 3/1994 |
| EP | 0639692 A1 | 4/1994 |
| EP | 0666423 A1 | 1/1995 |
| EP | 0672821 A1 | 1/1995 |
| EP | 0643225 A1 | 3/1995 |
| EP | 0689782 A1 | 1/1996 |
| EP | 0702171 A1 | 3/1996 |
| EP | 0714645 A1 | 6/1996 |
| EP | 0751596 A2 | 1/1997 |
| EP | 0820739 A2 | 1/1998 |
| EP | 0851124 A1 | 7/1998 |
| EP | 0770186 B1 | 9/1998 |
| EP | 0876782 A1 | 11/1998 |
| EP | 1083334 B1 | 3/2001 |
| EP | 1424447 A1 | 6/2004 |
| EP | 1536091 A1 | 6/2005 |
| EP | 1744034 A2 | 1/2007 |
| EP | 1754860 A2 | 2/2007 |
| EP | 1757860 A2 | 2/2007 |
| EP | 1772530 A2 | 4/2007 |
| EP | 1870599 A1 | 12/2007 |
| EP | 1424447 B1 | 5/2008 |

* cited by examiner

US 9,279,325 B2

TURBOMACHINE WHEEL ASSEMBLY HAVING SLOTTED FLANGES

BACKGROUND OF THE INVENTION

The subject matter disclosed herein relates to the art of turbomachines and, more particularly, to a turbomachine wheel assembly having slotted flanges.

Gas turbomachines include a compressor portion linked to a turbine portion through a common compressor/turbine shaft and a combustor assembly. The compressor portion guides compressed air flow through a number of sequential stages toward the combustor assembly. In the combustor assembly, the compressed air flow mixes with a fuel to form a combustible mixture. The combustible mixture is combusted in the combustor assembly to form hot gases. The hot gases are guided to the turbine portion through a transition piece. The hot gases expand through the turbine portion acting upon turbine blades mounted on wheels to create work that is output, for example, to power a generator, a pump, or to provide power to a vehicle.

Multiple wheels are connected to spacers by bolted joints to form a stacked wheel assembly. Typically, D-nuts are employed at one end of a fastener portion of the bolted joint. In some cases, the D-nuts act upon one another to prevent rotation of the fastener portion while a nut is tightened on an opposing end. In other cases, the D-nuts act upon an outer/inner, flange extensions/arms on the wheel. In such cases, the D-nuts apply an radial force to the outer/inner flange extensions/arms.

BRIEF DESCRIPTION OF THE INVENTION

According to one aspect of an exemplary embodiment, a turbomachine wheel assembly having slotted flanges includes a turbomachine wheel having a first wheel arm and a second, opposing wheel arm. The first wheel arm includes a first flange having a first radially outer surface and the second wheel arm includes a second flange having a second radially outer surface. The second flange includes a fastener retaining member extending axially outwardly from the second radially outer surface and an opening extending axially through the second flange at the fastener retaining member. The fastener retaining member includes at least one wall section extending radially inward from the second radial outer surface According to another aspect of an exemplary embodiment, a method of joining a turbomachine spacer to a wheel assembly includes installing a mechanical fastener at a fastener retaining member extending axially outwardly from a diametric surface adjacent a radially outer surface of a flange provided on the wheel assembly. Rotation of the mechanical fastener is constrained through an interaction with the fastener retaining member, positioning a spacer adjacent to the wheel assembly. A passage extending through the spacer is aligned with an opening extending through the flange at the fastener retaining member and a mechanical fastener element is positioned through the passage and into the opening. The mechanical fastener element operatively connects with the mechanical fastener.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
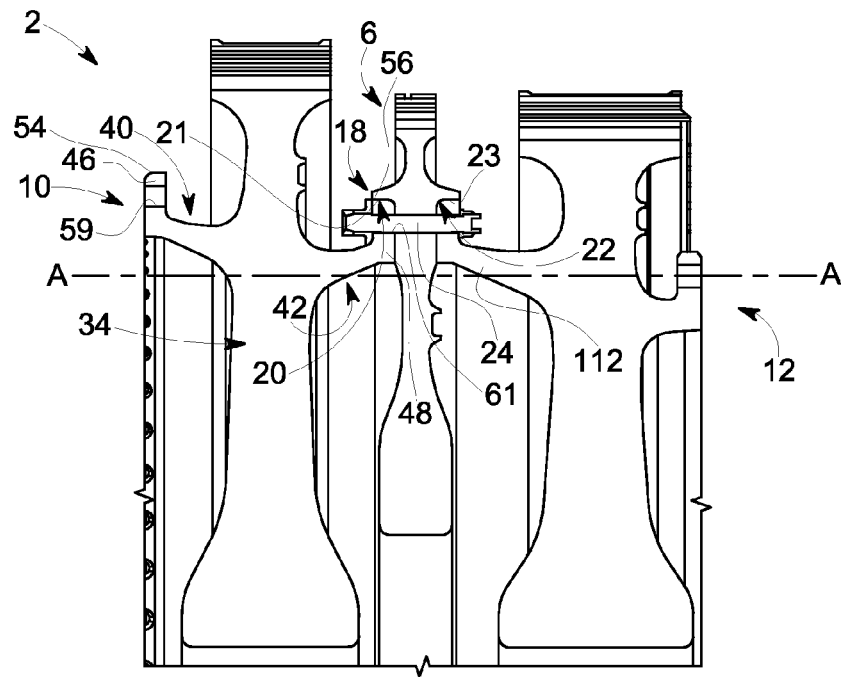
FIG. 1 is a schematic view of a turbomachine stacked wheel assembly connected in accordance with an exemplary embodiment.
Figure 2:
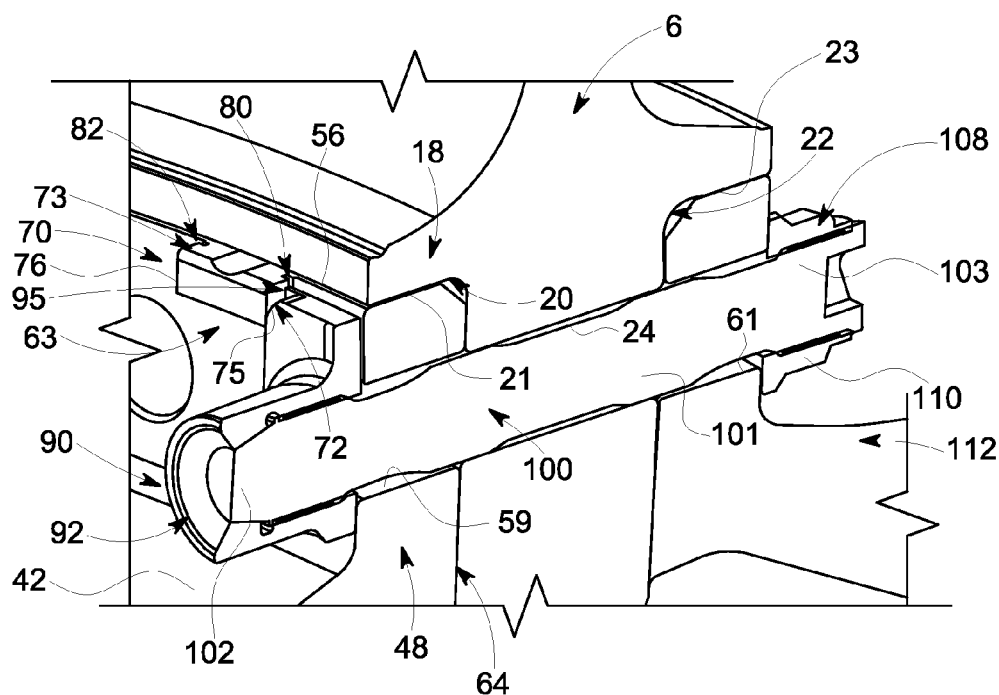
FIG. 2 is a cross-sectional partial perspective view of a bolted joint of the stacked wheel assembly of FIG. 1.

A portion of a turbomachine stage in accordance with an exemplary embodiment is indicated generally at 2 in FIGS. 1 and 2. Turbomachine stage 2 includes a spacer 6 operatively connected between a first wheel assembly 10 and a second wheel assembly 12. spacer 6 Spacer 6 includes a wheel mounting zone 18 including a first rabbet 20 defining a first wheel surface 21 and a second rabbet 22 defining a second wheel surface 23. A plurality of passages, one of which is indicated at 24 extends through spacer 6 at wheel mounting zone 18.

First wheel assembly 10 includes a turbomachine wheel 34 including a first wheel arm 40 and a second, opposing wheel arm 42. First wheel arm 40 includes a first flange 46 and second wheel arm 42 includes a second flange 48. First flange 46 includes a first radial outer surface 54 and second flange 48 includes a second radial outer surface 56. The term "radial outer surface" should be understood to describe a surface that projects outwardly from a longitudinal axis "A" of turbomachine stage 2. First flange 46 also includes a first plurality of openings, one of which is indicated at 59 and second flange 48 includes a second plurality of openings, one of which is indicated at 61. In the exemplary embodiment shown, second flange 48 is coupled to spacer 6. More specifically, second flange 48 is shown to include an inner diametric surface 63 and an outer diametric surface 64. Outer diametric surface 64 abuts spacer 6 such that openings 61 register with passages 24.

Figure 3:
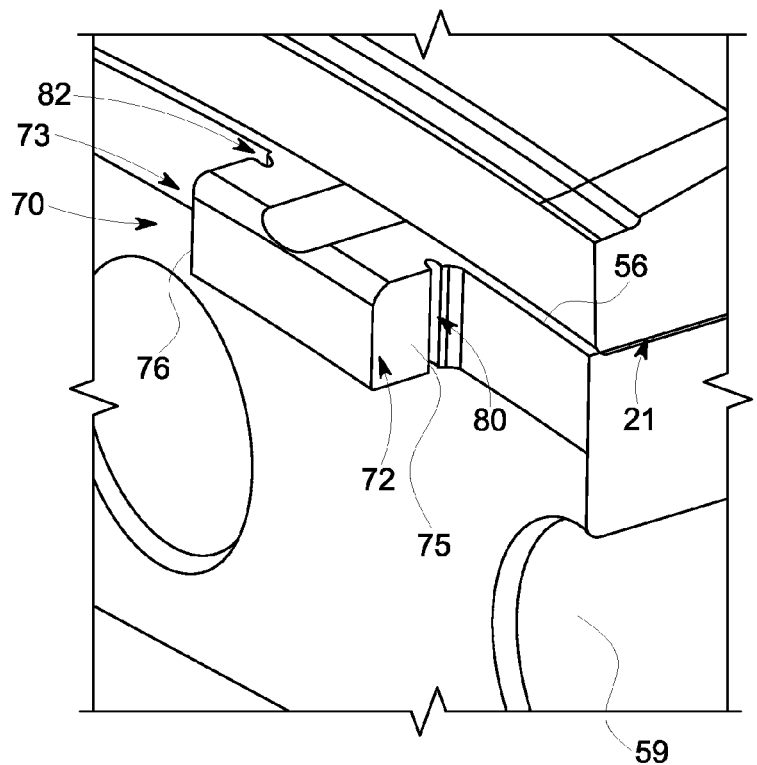
FIG. 3 is a partially cut-away perspective view of a mechanical fastener retaining member provided at the bolted joint of FIG. 2.

In accordance with an exemplary embodiment, turbomachine wheel 34 includes a plurality of fastener retaining members, one of which is indicated at 70 in FIG. 3. Fastener retaining members 70 are spaced one from another and extend axially outwardly from inner diametric surface 63 forming a plurality of slots (not separately labeled). The term "axially outwardly" should be understood that fastener retaining member 70 projects outwardly from second flange 48 along longitudinal axis "A". Fastener retaining member 70 includes a first wall section 72 and a second wall section 73. First and second wall sections 72 and 73 include corresponding first and second surfaces 75 and 76 that extend generally radially along fastener retaining member 70. First and second wall sections 72 and 73 also include corresponding first and second keyways 80 and 82 that extend into respective ones of first and second surfaces 75 and 76. First and second surfaces 75 and 76 and first and second keyways 80 and 82 provide an axial retention feature for a mechanical fastener, such as shown at 90, when assembled in a vertical orientation.

Figure 4:
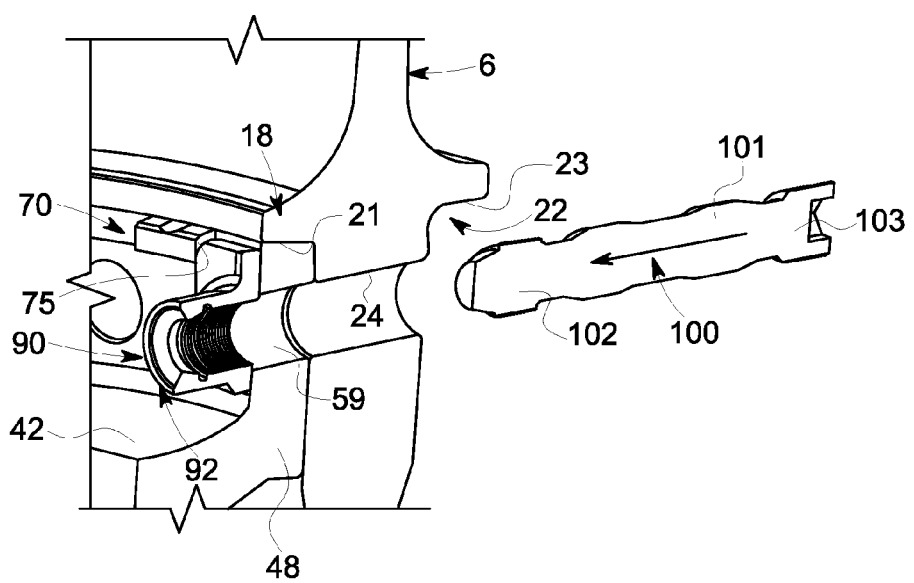
FIG. 4 is a partially exploded view of the bolted joint of FIG. 2.

Reference will now follow to FIG. 4 in describing a method for assembling turbomachine wheel 34 to spacer 6. Mechanical fastener 90 takes the form of a D-nut 92 that is sized so as to be positioned between adjacent fastener retaining member 70. In accordance with an aspect of an exemplary embodiment, D-nut 92 includes a key element or wing 95 that extends into first keyways 80 and another keyway (not shown) provided on an adjacent fastener retaining member (also not shown). Once D-nut 92 is positioned between adjacent fastener retaining member 70, a mechanical fastener element 100, shown in the form of a stud or bolt 101 is passed through passage 24 and into opening 59. Bolt 101 includes a first threaded end 102 and a second threaded end 103. First threaded end 102 engages with threads (not separately labeled) provided in D-nut 92 and another mechanical fastener 108 is operatively coupled to the second threaded end 103. The another mechanical fastener 108 takes the form of a nut 110 that is provided to secure a wheel arm 112 of second wheel assembly 12 to form a bolted joint. Rotation of D-nut 92 is constrained when nut 110 is rotated or tightened causing an outer flat surface (not separately labeled) of D-nut 92 to abut one of wall sections 72 and 73.

Figure 5:
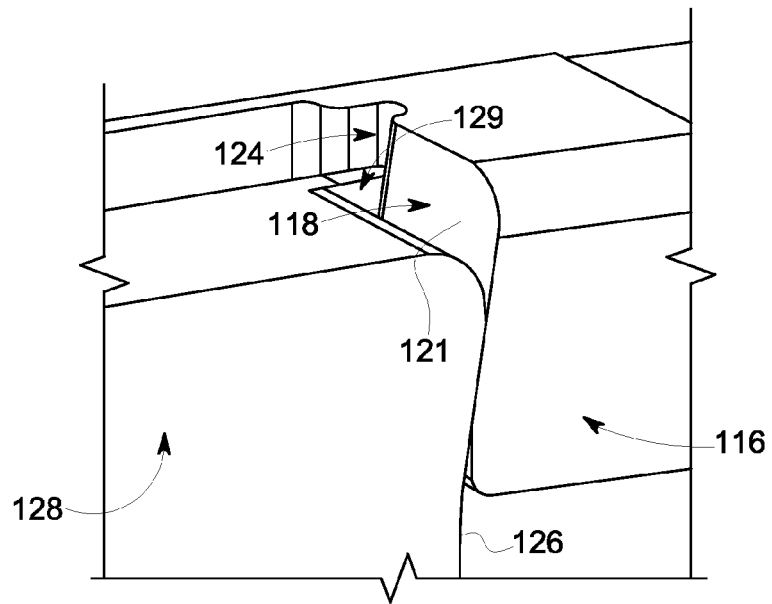
FIG. 5 is a partial perspective view of a mechanical fastener retaining member in accordance with an aspect of the exemplary embodiment.

At this point it should be understood that the exemplary embodiments provide a fastener retaining member that constrains rotation of mechanical fasteners used in a bolted joint of a turbomachine. The fastener retaining member includes surfaces that interact with a mechanical fastener. In this manner, radial outer forces acting on an outer edge of the flange are reduced or eliminated. Controlling the radial outer forces leads to reduced wheel damage. It should also be understood that the particular geometry of the fastener retaining element may vary. For example, FIG. 5 illustrates a fastener retaining element 116 having a first wall section 118 and a second wall section (not shown), the first wall section 118 and second wall section include tapered surfaces such as shown at 121 in connection with first wall surface 118. Fastener retaining element 116 is also shown to include keyways, one of which is shown at 124. The tapered surfaces facilitate a more uniform contact between side portions 126 of a D-nut 128, wall surface 118, and a wall surface on an adjacent fastener retaining member (not shown). A key element 129 on D-nut 128 extends into keyway 124 to facilitate axial retention as discussed above. It should also be understood that the fastener retaining element may be employed in many wheel assembly configurations.

Figure 6:
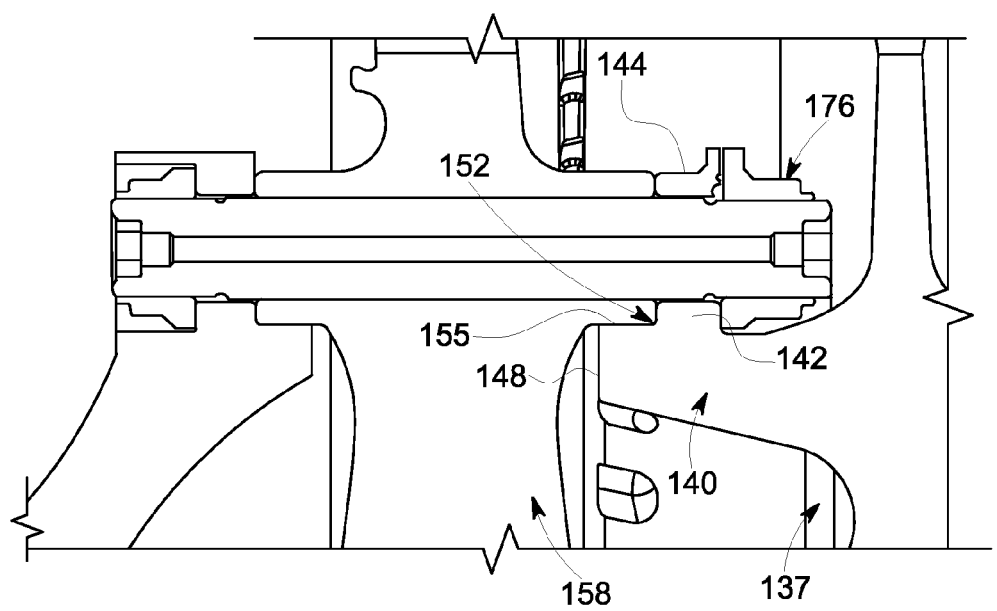
FIG. 6 is a cross-sectional plan view of a bolted joint in accordance with another aspect of an exemplary embodiment.
Figure 7:
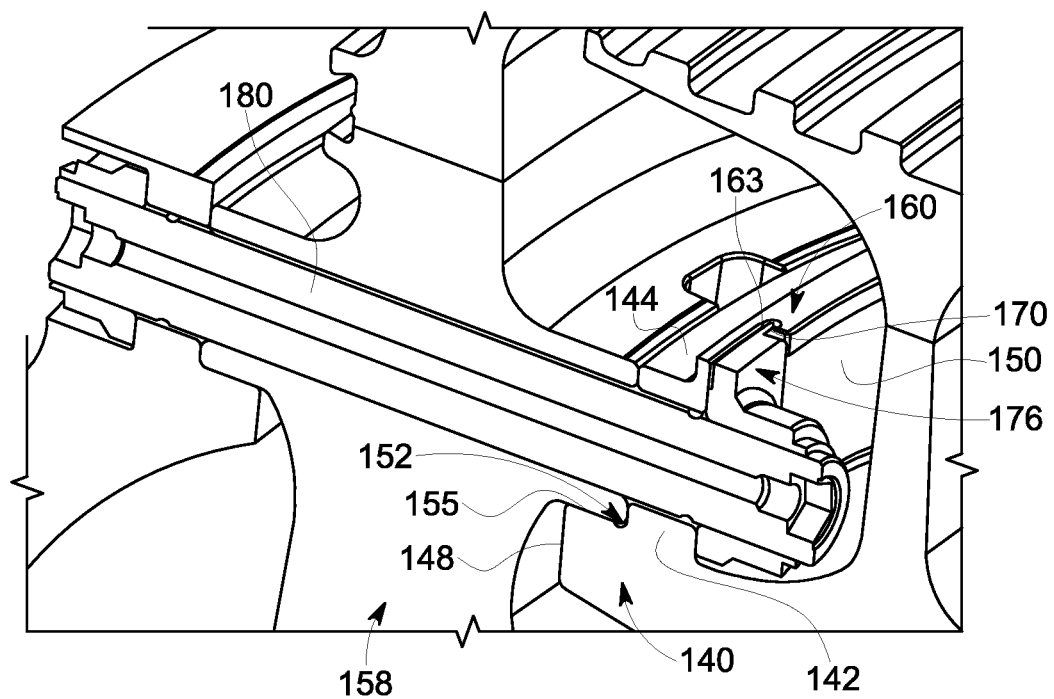
FIG. 7 is a partial perspective view of the bolted joint of FIG. 6.

For example, as shown in FIGS. 6 and 7, a turbomachine wheel 137 includes a wheel arm 140 having a flange 142 with a radial outer surface 144. Flange 142 is also shown to include an outer diametric surface 148 and an inner diametric surface 150. Outer diametric surface 148 includes a rabbet 152 that includes a spacer support surface 155. Spacer support surface 155 supports, at least in part, a spacer 158. A plurality of fastener retaining elements, one of which is indicated at 160, is provided on inner diametric surface 150. Each fastener retaining element 160 includes first and second keyways, one of which is indicated at 163. Keyways 163 are configured to receive a key element or wing 170 formed on a mechanical fastener 176. In a manner similar to that described above, interaction between key elements 170 and keyways 163 provide axial retention of mechanical fastener 176 when installed in a vertical position, while adjacent fastener receiving elements 160 constrain rotation of mechanical fastener 176 to facilitate a connection with a bolt 180 to establish a bolted joint.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbomachine wheel assembly having slotted flanges comprising:
a turbomachine wheel including a first wheel arm and a second, opposing wheel arm, the first wheel arm including a first flange having a first radially outer surface and a second wheel arm including a second flange having a second radially outer surface, the second flange including a fastener retaining member extending axially outwardly from the second radially outer surface and an opening extending axially through the second flange at the fastener retaining member, the fastener retaining member including at least one wall section extending radially inward from the second radially outer surface.

2. The wheel assembly according to claim 1, wherein the second flange includes an outer diametric surface and an inner diametric surface, the fastener retaining member extending from the inner diametric surface.

3. The wheel assembly according to claim 1, wherein the at least one wall section includes a first wall section and a second wall section.

4. The wheel assembly according to claim 3, wherein the at least one wall section includes a taper.

5. The wheel assembly according to claim 3, further comprising: a mechanical fastener positioned at the fastener retaining member, the mechanical fastener being configured and disposed to abut the at least one wall section.

6. The wheel assembly according to claim 5, wherein the mechanical fastener comprises a D-nut.

7. The wheel assembly according to claim 5, further comprising: a spacer including a wheel mounting zone abutting the second flange, the wheel mounting zone having a passage extending axially through the spacer, the passage being configured and disposed to register with the opening extending through the second flange.

8. The wheel assembly according to claim 7, further comprising: a mechanical fastener element extending through the passage into the opening, the mechanical fastener element operatively engaging with the mechanical fastener arranged at the fastener retaining member.

9. The wheel assembly according to claim 7, wherein the wheel mounting zone includes a rabbet defining a wheel support surface configured and disposed to adjoin the second radially outer surface of the spacer.

10. The wheel assembly according to claim 1, wherein the second flange includes a rabbet extending radially inwardly from the second radially outer surface.

11. The wheel assembly according to claim 1, further comprising: a keyway provided in the fastener retaining member.

12. The wheel assembly according to claim 11, wherein the keyway extends into the at least one wall section.

13. The wheel assembly according to claim 12, further comprising: a mechanical fastener provided at the fastener retaining member, the mechanical fastener including one or more key elements configured and disposed to nest within the keyway to axially constrain the mechanical fastener when the wheel assembly is generally vertically assembled.

14. A method of joining a spacer to a wheel assembly in a turbomachine, the method comprising:
- installing a mechanical fastener at a fastener retaining member extending axially outwardly from a diametric surface adjacent a radially outer surface of a flange provided on a wheel arm of the wheel assembly;
- constraining rotation of the mechanical fastener through an interaction with the fastener retaining member;
- positioning a spacer adjacent to the wheel arm;
- aligning a passage extending through the spacer with an opening extending through the flange at the fastener retaining member;
- positioning a mechanical fastener element through the passage and into the opening; and
- operatively connecting the mechanical fastener element with the mechanical fastener.

15. The method according to claim 14, wherein constraining rotation of the mechanical fastener includes abutting an outer surface of the mechanical fastener with at least one wall section of the fastener retaining member.

16. The method according to claim 15, wherein abutting the outer surface of the mechanical fastener with the at least one wall section includes abutting the outer surface of the mechanical fastener with a tapered surface of the fastener retaining member.

17. The method according to claim 14, further comprising: axially retaining the mechanical fastener by engaging a key element provided on the mechanical fastener with a keyway provided in the fastener retaining member.

18. The method of claim 14, wherein positioning the spacer adjacent to the wheel assembly includes adjoining a wheel surface formed by a rabbet on the spacer with the radially outer surface of the flange.

19. The method of claim 14, wherein positioning the spacer adjacent to the wheel assembly includes supporting the wheel assembly on a spacer support surface defined by a rabbet formed in the flange.

20. The method of claim 14, further comprising: operatively connecting another mechanical fastener to the mechanical fastener element, the another mechanical fastener securing the spacer to an opposing flange of the wheel assembly.

* * * * *